United States Patent [19]
Galli et al.

[11] Patent Number: 4,521,566
[45] Date of Patent: Jun. 4, 1985

[54] POLYPROPYLENE COMPOSITIONS HAVING IMPROVED IMPACT STRENGTH PROPERTIES AT LOW TEMPERATURES AND PROCESS FOR PREPARING SAME

[75] Inventors: Paolo Galli; Mario Spataro, both of Ferrara, Italy

[73] Assignee: Montedison S.p.A., Milan, Italy

[21] Appl. No.: 434,110

[22] Filed: Oct. 13, 1982

[30] Foreign Application Priority Data

Oct. 14, 1981 [IT] Italy ................................ 24475 A/81

[51] Int. Cl.$^3$ ...................... C08F 297/08; C08L 23/16
[52] U.S. Cl. .................................... 525/247; 525/322; 525/323; 525/240
[58] Field of Search .................... 525/247, 322, 323

[56] References Cited

U.S. PATENT DOCUMENTS 4,128,606  12/1978  Furutachi et al. .................. 525/247
4,291,138   9/1981  Sato et al. ............................ 525/247

Primary Examiner—Wilbert J. Briggs, Sr.

[57] ABSTRACT

Polypropylene compositions having high impact strength at low temperatures comprising as essential components:
   100 parts by weight of polypropylene having an isotacticity index >90,
   8–25 parts by weight of an amorphous copolymeric fraction (1) of ethylene-propylene soluble in xylene at 23° C., containing 20–80% by weight of ethylene,
   2–10 parts by weight of an ethylene-propylene crystalline copolymeric fraction (2) having a crystallinity of the polyethylene type containing 50–90% by weight of ethylene;
and in which the weight ratio between the total polymerized ethylene and fraction (1) is <1.

The compositions are prepared by polymerization processes comprising at least a step of homopolymerization of propylene to stereoregular polymer and a subsequent step of polymerization of ethylene-propylene mixtures in the presence of catalysts comprising a titanium compound carried on a magnesium halide in active form.

2 Claims, No Drawings

POLYPROPYLENE COMPOSITIONS HAVING IMPROVED IMPACT STRENGTH PROPERTIES AT LOW TEMPERATURES AND PROCESS FOR PREPARING SAME

BACKGROUND OF THE INVENTION

The present invention relates to new polypropylene compositions having improved impact strength properties at low temperatures and to a process for preparing same.

As is known, the isotactic polypropylene is endowed with an exceptional combination of excellent properties which render it suitable for a very great number of uses, including appliances at high temperatures; however, it exhibits the drawback of possessing an insufficient impact strength at relatively low temperatures.

Attempts were made to obviate such drawback, without remarkably affecting adversely, however, the other properties of the polymer, either by properly modifying the synthesis process or by blending with rubbers.

The modifications to the synthesis process essentially consist in introducing into the propylene stereoregular homopolymerization process one or more steps of copolymerization of ethylene-propylene mixtures.

The copolymerization conditions of the ethylene-propylene mixtures are selected in such manner as to reduce as much as possible the formation of amorphous ethylene-propylene bipolymer and, on the contrary, to enhance the formation of crystalline ethylene-propylene bipolymer besides, optionally, polyethylene.

This for the reason that the amorphous bipolymer is soluble in hydrocarbon solvents, and in the polymerization processes conducted in the presence of such solvents the formation of the amorphous bipolymer, besides lowering the polypropylene yield, tends to excessively increase the viscosity of the polymerization slurry with ensuing difficulties in the transfer and centrifugation steps of said slurry in order to recover the solid polymer.

In the processes performed in the gas phase the presence of significant amounts of amorphous polymer tends to increase the tackiness of the solid polymeric phase, which results in the fouling of the reactor.

According to the teachings of the prior art, the presence of meaningful amounts of crystalline copolymer is desirable since this results in an improvement of the impact strength properties at low temperatures without remarkably adversely affecting the optical properties (transparency, etc.) and the mechanical properties.

Representative processes and compositions of the art are described in U.S. Pat. Nos. 3,629,368; 3,670,053 and 3,200,173.

The impact strength properties at low temperatures of the isotactic polypropylene can be improved by adding rubbers, in particular ethylene-propylene rubbers, thereto.

According to U.S. Pat. No. 3,627,852 it is necessary, however, to incorporate considerably high amounts of ethylene-propylene rubber in order to achieve a significant improvement.

This involves a drastic worsening of the mechanical properties (flexural rigidity and stability to high temperatures).

Studies accomplished by us allowed to ascertain that the presence of crystalline ethylene-propylene copolymer and optionally of polyethylene in the polypropylene having a high isotacticity index does not contribute to improve the impact strength properties of the polymer; on the contrary, it tends to impair the total balance of the properties.

On the basis of a model studied by us it appears that the impact strength properties of a polypropylene modified with an amorphous ethylene-propylene copolymer substantially depend on the amount and quality of the copolymer.

The function of the copolymer seems to be that of absorbing, at least partially, the impact energy in the area of graft and propagation of the fracture, with consequent improvement of the impact strength of the system.

THE PRESENT INVENTION

Contrary to any expectation, it has now surprisingly been found that it is possible to operate, in both the continuous and discontinuous processes of synthesis of modified polypropylene comprising at least a stereoregular homopolymerization step and successively a copolymerization step of ethylene-propylene mixtures, under conditions in which the resulting polymer exhibits relatively low values of the ratio between total polymerized ethylene and fraction soluble in xylene at 23° C. (consisting of amorphous ethylene-propylene copolymer) without the occurrence of the drawbacks exhibited by the processes of the prior art.

The impact strength properties at low temperature of the modified polypropylene prepared according to the process of this invention are unexpectedly better—the polymerized ethylene being equal—than those of similar products obtainable according to the processes of the prior art.

Owing to the relatively low content of total polymerized ethylene necessary to attain significant improvements in the impact strength of the isotactic polypropylene, the mechanical properties of the same do not suffer a sensible worsening.

The compositions of this invention comprise:

100 parts by weight of polymer having an isotacticity index higher than 90, preferably higher than 95;

8–25 parts by weight of a fraction (1) soluble in xylene at 23° C., consisting of an amorphous ethylene-propylene copolymer containing from about 20 to 80% by weight of ethylene, preferably 40–60% by weight;

2–10 parts by weight of a fraction (2) consisting of a crystalline ethylene-propylene copolymer containing from 50 to 98% by weight of ethylene, exhibiting a crystallinity of the polyethylene type.

The total content of polymerized ethylene ranges from 4 to 20% by weight.

Furthermore, the compositions are characterized in that the ratio (by weight) between total polymerized ethylene and fraction soluble in xylene at 23° C. (essentially consisting of amorphous ethylene-propylene copolymer) is lower than 1 and generally ranges from 0.2 to 0.8. Such ratio increases as the content of polymerized ethylene increases.

The relatively low values of the above mentioned ratio prove that the rubber-like copolymer is present in prevailing amounts with respect to the crystalline copolymer.

Indicatively, we may say that when fraction (1) is present for 13%, fraction (2) is lower than 5% (by weight).

The molecular weight of the various components, determined by measurements of the intrinsic viscosity at 135° C., varies as a function of the nature of the components.

The intrinsic viscosity values for the various components are within the following ranges:
1–3.5 dl/g for polypropylene; 2–8 dl/g for fraction (1) and 2–15 dl/g for fraction (2).

A product containing 7% by weight of polymerized ethylene and having the following compositions by weight:

|  | % | % by weight $C_2^-$ | $[\eta]$ |
|---|---|---|---|
| polypropylene | 86.3 | — | 1.4 |
| fraction (1) | 12.5 | ~45 | 2.5 |
| fraction (2) | 3.2 | ~36 | 3.5 | exhibits the following characteristics:

|  | Unit | Method |  |
|---|---|---|---|
| Melt flow rate "L" | g/10 min. | ASTM D-1238 | 7.5 |
| Flexural modulus | MPa | ASTM D-790 | 1350 |
| Brittle-ductile transition temperature (Ball drop) | °C. | ME-17116 | −40 |
| Izod impact test |  |  |  |
| on notched bar at +23° C. | J/m | ASTM D-256 | 142 |
| on notched bar at 0° C. | J/m | ASTM D-256 | 78 |
| Distortion temperature (HDT) at 46 N/cm² | °C. | ASTM D-648 | 95 |

The compositions according to this invention are prepared by polymerization processes of propylene and ethylene-propylene mixtures of known type comprising at least a stereoregular homopolymerization step of propylene and a successive polymerization step of ethylene and propylene mixtures in which use is made of high-yield and high-stereospecificity catalysts comprising a titanium compound carried on a magnesium halide in active form as are defined for example in U.S. Pat. Nos. 4,226,741 and 4,149,990, in German patent application No. 2,933,997 and in European patent application Nos. 81/106301.5; 81/106300.7; 81/106299.1. It is operated under conditions in which, in the propylene homopolymerization step or steps, the polypropylene obtained has an isotacticity index higher than 90, preferably higher than 95, and represents 65–90% by weight of the final product, and, in the ethylene-propylene copolymerization step, an amorphous ethylene-propylene copolymer is obtained in such amount that, in the final product, the ratio between total polymerized ethylene and fraction soluble in xylene at 23° C. is lower than 1.

The catalysts preferably employed are the ones described in U.S. Pat. No. 4,149,990, in German Application No. 2,904,598 and in European patent application Nos. 81/106301.5; 81/106300.7 and 81/106299.1.

The polymerization processes are conducted either continuously or discontinuously according to conventional techniques, operating in the liquid phase either in the presence or in the absence of an inert hydrocarbon diluent, or in the gas phase, or according to liquid-gas mixed techniques.

The polymerization process in the liquid phase in the presence of inert hydrocarbon solvents (suspension process) incudes, if conducted continuously, the homopolymerization in two steps, either with or without degassing for recovering the unreacted propylene, and the ethylene-propylene copolymerization in a third step.

The polymeric suspension is centrifuged in order to separate the solvent and to recover the atactic polymer dissolved therein. The product is then conveyed to the drying and granulation steps.

The process in the liquid monomer, if conducted continuously, includes the homopolymerization of propylene in one step or in more steps, followed by a copolymerization step of ethylene-propylene in liquid propylene. It follows a flash of propylene and other gases with recovery of the monomer and the step of drying and granulation of the product.

The mixed process, if conducted continuously, includes a homopolymerization step of propylene in the liquid monomer in one or more steps and the copolymerization of ethylene in a system consisting of a fluid bed reactor with external recycle of the gases. A finishing and granulation step follows.

The process in the gas phase, if conducted continuously, comprises a homopolymerization step of propylene in the gas phase in one or more steps and the copolymerization of ethylene in another final step, in the gas phase as well.

The reactors may be either of the fluidized bed type or of the agitated bed type: in any case they are characterized by the absence of dispersants such as solvents and liquid monomers. It follows a degassing step of the polymer from the unconverted monomers and the granulation step.

EXAMPLES 1 AND 2

Two continuous suspension polymerization tests were carried out under the conditions specified in Table 1.

The obtained polymers, after finishing and granulation, exhibited the characteristics indicated in said table.

A comparison between the products exemplified in examples 1 and 2 shows the effect exerted on the characteristics by the amount and quality of the ethylene/propylene bipolymer produced. The product of example 2, although containing a lower amount of total ethylene, shows a balance of characteristics better than type 1.

The catalyst employed in example 1 was prepared by operating according to example 1 of U.S. Pat. No. 4,226,741. The Al/donor ratio was maintained at such values as to obtain an isotacticity index equal to 94 in the 1st homopolymerization step. The catalyst of example 2 was prepared by operating according to example 9 of European patent application No. 81/106301.5.

EXAMPLES 3 AND 4

In a plant operating continuously according to the mixed liquid-gas polymerization technique, two runs were carried out under the conditions specified in Table 2.

The propylene and the catalyst (in heptane suspension) were fed to a first reactor, wherein the homopolymerization in liquid propylene was accomplished. The slurry of the first reactor passed to a second homopolymerization reactor, which too was operating under conditions in which the polymerization was carried out in the liquid monomer. The slurry was then fed, along with a gaseous mixture of ethylene and propylene, to a third reactor, in which the copolymerization of ethylene and propylene was accomplished in the gas phase. The catalyst utilized in example 4 was the same of example 2; the one of example 3 was obtained by operating according to example 20 of European patent application No. 81/106301.5.

The polymers obtained after finishing and granulation exhibited the characteristics recorded on Table 2.

A comparison between the products of examples 3 and 4 clearly shows that—the content of amorphous product being equal—a bipolymer having an ethylene/propylene composition tending to 50/50 (example 3) imparts to the polymer a combination of properties which are more interesting than those obtainable with a polymer in which the ethylene/propylene ratio tends to a value of 20/80 (example 4).

EXAMPLES 5 AND 6 AND COMPARATIVE EXAMPLES 1-2

The tests were conducted in a 1.3-liter autoclave according to a polymerization process in suspension in a solvent (hexane), operating discontinuously and in two steps.

The first step (homopolymerization) comprised the introduction of propylene and catalyst in a hexane suspension.

The second step (copolymerization) comprised the introduction, into the same autoclave, after degassing of the unreacted propylene, of an ethylene-propylene mixture in the desired ratios. After degassing of the unreacted monomers, the slurry was centrifuged and the polymer granulated.

The conditions employed in the homopolymerization step and in the copolymerization step as well as the rigidity and impact strength characteristics of the products are recorded on Table 3. The catalyst employed in all examples was prepared by operating according to example 1 of U.S. Pat. No. 4,226,741.

Examples 5 and 6 show the beneficial effect, at two melt index levels, of the values lower than 1 of the ratio between total polymerized ethylene and fraction soluble in xylene at 23° C. In the comparative examples the ratio was maintained at values higher than 1 and the impact strength properties were lower than those of examples 5 and 6 in spite of the higher total ethylene content of the final product.

The determinations according to ME methods indicated in the tables or cited in the description were carried out according to the following modalities:

ethylene determination (ME 15600) by infrared spectroscopy;

the polymer fraction soluble in xylene at 23° C. (ME 15558) by solubilization of the product in xylene at 23° C. and filtration;

the brittle-ductile transition temperature (ME 17116) by using a BALL-DROP type instrument and by taking the temperature at which 50% of the examined test pieces break in a brittle manner;

the impact energy (ME 17142) by means of a BALL-DROP instrument with autographic evaluation of the impact energy.

TABLE 1

| | Unit | Method | Example 1 1st step homopolymerization | Example 1 2nd step homopolymerization | Example 1 3rd step copolymerization | Example 2 1st step homopolymerization | Example 2 2nd step homopolymerization | Example 2 3rd step copolymerization |
|---|---|---|---|---|---|---|---|---|
| Temperature | °C. | — | 70 | 70 | 60 | 70 | 70 | 60 |
| Pressure | atm.gauge | — | 11.5 | 7.5 | 0.6 | 11.5 | 5.5 | 1.3 |
| Dwell time | hours | — | 3.5 | 4.0 | 2.5 | 3.5 | 4.0 | 2.5 |
| Isotacticity index | % | ME-16008 | 94 | 93 | — | 95 | 95 | — |
| Melt index L | g/10 min | ASTM D-1238 | 10 | 10 | — | 11 | 11 | — |
| Feed ratio $C_2^-/C_2^- + C_3^-$ | moles/moles | — | — | — | 0.43 | — | — | 0.38 |
| Total ethylene | % by weight | ME-15600 | — | — | 8.5 | — | — | 6.5 |
| Fraction soluble in xylene | % by weight | ME-15558 | — | — | 9.2 | — | — | 12.5 |
| $C_2^-$ in the xylene-soluble fraction | % by weight | ME-15600 | — | — | 52 | — | — | 40 |
| $C_2^-$ in the xylene-insoluble fraction | % by weight | ME-15600 | — | — | 4.0 | — | — | 2.8 |
| Melt index L | g/10 min | ASTM D-1238 | — | — | 6.7 | — | — | 7.6 |
| Flexural elastic modulus | MPa | ASTM D-790 | — | — | 1400 | — | — | 1350 |
| Brittle/ductile (Ball-Drop) | °C. | — | — | — | −37 | — | — | −39 |
| Impact strength IZOD on notched bar at +23° C. | J/m | ASTM D-256 | — | — | 108 | — | — | 142 |
| Gloss | %° | ME-18021 | — | — | 45 | — | — | 49 |
| HDT (46 N/cm$^2$) | °C. | ASTM D-648 | — | — | 97 | — | — | 95 |

TABLE 2

| | Unit | Method | Example 3 1st step homopolymerization | Example 3 2nd step homopolymerization | Example 3 3rd step copolymerization | Example 4 1st step homopolymerization | Example 4 2nd step homopolymerization | Example 4 3rd step copolymerization |
|---|---|---|---|---|---|---|---|---|
| Temperature | °C. | — | 70 | 75 | 50 | 60 | 65 | 50 |
| Pressure | atm. gauge | — | Equilib. | Equilib. | 5 | Equilib. | Equilib. | 4.6 |
| Dwell time | hours | — | 2.9 | 1.6 | 1.0 | 1.5 | 1.6 | 1.0 |
| Isotacticity index | % | ME-16008 | 94 | 94.5 | — | 93 | 94 | — |
| Melt index L | g/10 min. | ASTM D-1238 | 1.8 | 1.6 | — | 1.9 | 1.9 | — |
| Feed ratio $C_2^-/C_2^- + C_3^-$ | moles/moles | — | — | — | 0.43 | — | — | 0.27 |
| Total ethylene | % by weight | ME-15600 | — | — | 10.9 | — | — | 6.6 |
| Fraction soluble in xylene | % by weight | ME-15558 | — | — | 16.4 | — | — | 18.2 |
| $C_2^-$ in the xylene | % by weight | ME-15600 | — | — | 38 | — | — | 22 |

TABLE 2-continued

| | Unit | Method | Example 3 | | | Example 4 | | |
|---|---|---|---|---|---|---|---|---|
| | | | 1st step homopoly-merization | 2nd step homopoly-merization | 3rd step copolymer-ization | 1st step homopoly-merization | 2nd step homopoly-merization | 3rd step copolymer-ization |
| soluble fraction $C_2^-$ in the xylene-insoluble fraction | % by weight | ME-15600 | — | — | 5 | — | — | 3 |
| Melt index L | g/10 min. | ASTM D-1238 | — | — | 1.2 | — | — | 1.6 |
| Flexural elastic modulus | MPa | ASTM D-790 | — | — | 950 | — | — | 900 |
| Brittle/ductile (Ball-Drop) | °C. | — | — | — | <−45 | — | — | −22 |
| Impact strength IZOD on notched bar at +23° C. | J/m | ASTM D-256 | — | — | does not break | — | — | does not break |
| Impact strength IZOD on notched bar at 0° C. | J/m | ASTM D-256 | — | — | 225 | — | — | 129 |
| HDT (46 N/cm$^2$) | °C. | ASTM D-648 | — | — | 70 | — | — | 70 |

TABLE 3

| | Unit | Method | Example 5 | | Comparative example 1 | | Example 6 | | Comparative example 2 | |
|---|---|---|---|---|---|---|---|---|---|---|
| | | | HOMOP. | COP. | HOMOP. | COP. | HOMOP. | COP. | HOMOP. | COP. |
| Temperature | °C. | — | 60 | 60 | 60 | 60 | 60 | 60 | 60 | 60 |
| Pressure | Atm. gauge | — | 13 | 3.2 | 13 | 3.3 | 13 | 3.2 | 13 | 3.5 |
| Dwell time | min. | — | 60 | 23 | 60 | 15 | 60 | 20 | 60 | 17 |
| Hydrogen (in gas phase) | mol. % | — | 4 | 0.7 | 4 | 1.3 | 5.5 | 1.4 | 5.5 | 1.4 |
| Fed ethylene/propylene | % by weight | — | / | 55/45 | / | 80/20 | / | 55/45 | / | 80/20 |
| Ethylene/propylene copolymer | % by weight | — | / | 16 | / | 17 | / | 15 | / | 16 |
| Total ethylene | % by weight | ME-15600 | 9 | | 14.5 | | 8.7 | | 13.7 | |
| Fraction soluble in xylene | % by weight | ME-15558 | 14.2 | | 7.6 | | 10.4 | | 7.1 | |
| $C_2^-$ in the xylene-sol. fraction | % by weight | ME-15600 | 37 | | 47.5 | | 35.5 | | 45.5 | |
| $[\eta^-]$ in the xylene-sol. fraction | dl/g | ME-15701 | 4.7 | | 4.7 | | 4.3 | | 4.6 | |
| $C_2^-$ in the xylene-insol. fraction | % by weight | ME-15600 | 4.4 | | 11.9 | | 4.5 | | 11.4 | |
| Melt index L | g/10 min. | ASTM D-1238 | 0.82 | | 0.75 | | 3.2 | | 3.0 | |
| Flexural elastic modulus | MPa | ASTM D-790 | 1150 | | 1190 | | 1340 | | 1275 | |
| Izod impact test on notched bar at +23° C. | J/m | ASTM D-256 | 160 | | 130 | | 78 | | 69 | |
| Impact energy (Dyna Tester) | Kg.cm | ME-17142 | 74 | | 74 | | 59 | | 35 | |

What we claim is:

1. A polypropylene composition having a high impact strength at low temperatures, comprising:
   (A) 100 parts by weight of polypropylene having an isotacticity index higher than 90;
   (B) 8-25 parts by weight of a copolymeric fraction soluble in xylene at 23° C. consisting of an amorphous ethylene-propylene copolymer containing from 20 to 80% by weight of ethylene;
   (C) 2-10 parts by weight of a fraction consisting of a crystalline ethylene-propylene copolymer exhibiting a polyethylene type crystallinity and containing from 50 to 90% by weight of ethylene;
   the total content of polymerized ethylene in said composition ranging from 4 to 20% by weight and the ratio by weight of total polymerized ethylene to fraction (B) being lower than 1.

2. A process for producing a composition according to claim 1 by polymerization of propylene and ethylene-propylene mixtures either continuously or discontinuously in consecutive steps including at least a step of stereoregular homopolymerization of propylene and a step of copolymerization of ethylene-propylene mixtures, which comprises carrying out the polymerization by the aid of a stereospecific coordination catalyst comprising a titanium compound supported on a magnesium dihalide in an active form having a surface area larger than 3 m$^2$/g and/or having an X-ray spectrum in which the line of maximum intensity appearing in the spectrum of nonactivated magnesium dihalde is broadened or substituted by a halo, under conditions in which in the homopolymerization step a polypropylene having an isotacticity index higher than 90 is formed in an amount ranging from 65 to 90% by weight of the final product, in the copolymerization step the conditions are selected so that an amorphous ethylene-propylene copolymer extractable with xylene at 23° C. is formed in such an amount that the ratio by weight of the total polymerized ethylene to such amorphous copolymer is lower than 1, and the total content of polymerized ethylene in the final product ranges from 4 to 20% by weight.

* * * * *